United States Patent
Krause et al.

(10) Patent No.: US 6,917,427 B2
(45) Date of Patent: Jul. 12, 2005

(54) HIGHLY ACCURATE CALIBRATION OF POLARIMETERS

(75) Inventors: Egbert Krause, Burgstaedt (DE); Adalbert Bandemer, Herrsching (DE)

(73) Assignee: Thorlabs GmbH, Karlsfeld (DE)

( * ) Notice: Subject to any disclaimer, the term of this patent is extended or adjusted under 35 U.S.C. 154(b) by 254 days.

(21) Appl. No.: 10/406,693

(22) Filed: Apr. 2, 2003

(65) Prior Publication Data

US 2003/0193667 A1 Oct. 16, 2003

(30) Foreign Application Priority Data

Apr. 10, 2002 (EP) .............................................. 02008021
Feb. 11, 2003 (EP) .............................................. 03002980

(51) Int. Cl.$^7$ .................................................. G01J 4/00
(52) U.S. Cl. ....................... 356/366; 356/364; 356/365; 356/368
(58) Field of Search ................................. 356/365, 364, 356/366, 367, 368, 369; 250/225

(56) References Cited

U.S. PATENT DOCUMENTS

| 5,296,913 | A | | 3/1994 | Heffner |
| 5,337,146 | A | * | 8/1994 | Azzam ....................... 356/367 |
| 6,211,957 | B1 | * | 4/2001 | Erdogan et al. ............ 356/364 |
| 6,384,916 | B1 | * | 5/2002 | Furtak ......................... 356/369 |
| 6,744,509 | B2 | * | 6/2004 | Davis et al. ................ 356/367 |
| 6,816,261 | B2 | * | 11/2004 | Patel et al. ................. 356/365 |

FOREIGN PATENT DOCUMENTS

DE   100 23 708 A1   11/2001

OTHER PUBLICATIONS

Azzam et al., "Construction, Calibration, and Testing of a Four–Detector Photopolarimeter," Rev. Sci. Instrum. vol. 59(1) (Jan. 1988).

* cited by examiner

*Primary Examiner*—Layla Lauchman
(74) *Attorney, Agent, or Firm*—Finnegan, Henderson, Farabow, Garrett & Dunner

(57) ABSTRACT

Highly accurate calibration of a polarimeter of the type having at least four detectors involves using four known states of polarisation of an input light signal (calibration polarisations) and at least one further state of polarisation. All input states of polarisation to the polarimeter have unity normalised power of the light signal and unity degree of polarisation. A Stokes matrix for the four calibration polarisations is generated with at least one variable correction parameter, and a correction matrix is determined from the Stokes matrix and a corresponding detector current matrix measured by the polarimeter. An optimisation criterion that is a function of the degrees of polarisation for the states of polarisation as measured by the polarimeter is generated. The correction parameter is varied iteratively to minimise the optimisation criterion so that the polarimeter is calibrated to produce unity power and degree of polarisation for any input state of polarisation.

15 Claims, 4 Drawing Sheets

HIGHLY ACCURATE CALIBRATION OF POLARIMETERS

BACKGROUND OF THE INVENTION

The present invention relates to optical measurement devices, and more particularly to a method of high accuracy calibration of complete polarimeters.

Commercially available polarimeters work either with only a detector and a rotatable wave plate or they are based on a multi-detector arrangement with four (or more) detectors. Complete polarimeters are polarimeters that measure all four Stokes parameters. On multi-detector polarimeters, the incident light power is broken down into at least four separate power components. At least three of the four power components pass polarising elements and thus become polarisation-dependent. One or several birefringent elements, which are arranged in front of the polarising elements, ensure that the maxima of the four detector currents occur at different input polarisations.

A 4×4 calibration matrix B for the polarimeter gives a clear connection between the four detector currents $I_0 \ldots I_3$ and the four Stokes parameters $S_0 \ldots S_3$.

$$S = B * I \qquad (1)$$

A four-detector polarimeter allows the parameters—(1) state of polarisation (SOP), (2) degree of polarisation (DOP) and (3) power of the light—to be measured from four measured detector currents. The parameters are derivable from the four Stokes parameters $S_0$ $S_1$, $S_2$ and $S_3$. $S_0$ is the total power, $S_1$, $S_2$ and $S_3$ are usually normalised to the total power, so that the normalised Stokes parameters $s_1, s_2$ and $s_3$ indicate the state of polarisation.

The degree of polarisation marks the ratio of the polarised power to the total power and is described by the formula $$DOP = SQRT(S_1^2 + S_2^2 + S_3^2)/S_0$$

A complete description of the polarisation characteristics of the light is provided mathematically with the help of the Stokes vector.

The Stokes vector is fully determined by the four Stokes parameters $S_0 \ldots S_3$, which are defined as follows: $S_0$ is the total power, $S_1$ is the component linearly polarised horizontally minus the component linearly polarised vertically, $S_2$ is the component polarised linearly at 45° minus the component polarised linearly at −45°, $S_3$ is the right circularly polarised component minus the left circularly polarised component.

A wave plate has a direction-dependent refractive index. Thus the generally linear partial waves experience different phase velocities and attain a phase difference, which changes their state of polarisation. A polariser dampens the partial wave in its reverse direction more strongly than the orthogonal component in the forward direction. Thus the transmitted light power becomes polarisation-dependent and a simple detection of the polarisation is made possible.

Polarimeters are employed e.g. for the following applications:

Determination of the polarisation, the power and the degree of polarisation (DOP)

Determination of the degree of polarisation (DOP) as a control signal for a PMD compensation Determination of the polarisation-dependent loss (PDL) of optical fibres and optical components Determination of the polarisation mode dispersion (PMD) of optical fibres and optical components Analysis of birefringent and polarising materials Determination of the extinction ratio (ER) for polarisation-maintaining fibres (PMF)

Evaluation of sensors on a polarimetric basis (e.g. Faraday current sensor)

Generation of control signals in automatic polarisation controllers and much more Apart from complete polarimeters, which measure all four Stokes parameters, there are devices which only determine the deviation of the polarisation from a specified condition. This task is performed already by simple polarisers, polarisation beam splitters etc.

For the calibration of a polarimeter, known states of polarisation and optical powers are usually fed into the polarimeter, and the associated detector signals are measured. From the known states of polarisation and the associated detector signals, a transmission function (calibration matrix) is calculated. The optical input signals must usually be known with a high precision.

In R. M. A. Azzam et al: "Construction, calibration and testing of a four-detector photopolarimeter", Review of Scientific Instruments, Vol. 59, No. 1, January, 1988, New York, U.S. pp. 84–88, the procedure for a usual "Four Point Calibration" is described. For the calibration of the polarimeters, four polarisations with known Stokes parameters $S_{i,j}$ are employed. The control variable i describes the corresponding Stokes parameter of the state of polarisation j. The four Stokes vectors are placed into the columns of matrix S. For each of the four known input polarisations, the four detector currents are measured and entered into the columns of matrix I.

The instrument matrix A is given by:

$$A = I * S^{-1}$$

Generally, the linear-horizontal (H), linear−45°(45°), circular-right (R) and linear-vertical (V) states of polarisation are employed. For the matrix S, it thus follows:

$$S = \begin{bmatrix} 1 & 1 & 1 & 1 \\ 1 & 0 & 0 & -1 \\ 0 & 1 & 0 & 0 \\ 0 & 0 & 1 & 0 \end{bmatrix}$$

Generally, however, the calibration can be performed at any four polarisations which are not on the same plane. In addition there is the demand that the power be constant and the DOP be equal to 1 (DOP=100%). Following normalisation to the constant power, the following then applies to the four Stokes vectors:

$$S_0^2 = S_1^2 + S_2^2 + S_3^2$$

$$S = \begin{bmatrix} 1 & 1 & 1 & 1 \\ S_{1,0} & S_{1,1} & S_{1,2} & S_{1,3} \\ S_{2,0} & S_{2,1} & S_{2,2} & S_{2,3} \\ S_{3,0} & S_{3,1} & S_{3,2} & S_{3,3} \end{bmatrix}$$

-continued $$S_{1,0}^2 + S_{2,0}^2 + S_{3,0}^2 = 1$$
$$S_{1,1}^2 + S_{2,1}^2 + S_{3,1}^2 = 1$$
$$S_{1,2}^2 + S_{2,2}^2 + S_{3,2}^2 = 1$$
$$S_{1,3}^2 + S_{2,3}^2 + S_{3,3}^2 = 1$$

The instrument matrix is calculated by $$A = I * S^{-1}$$

subsequently inverted $$B = A^{-1}$$

The polarimeter balanced in this way satisfies the relationship:

$$S = B * I$$

However, such balancing does not ensure that this value is also determined for any other input polarisation with a DOP of 100% (DOP=1), because the polarisation and the detector signals contain errors. In B. Heffner, U.S. Pat. No. 5,296,913, a method is presented which can improve the existing calibration of a polarimeter with the help of at least three different polarisations of the same degree of polarisation. The improvement consists in the addition of a 4×4 correction matrix C.

$$S = B * C * I$$

The correction matrix C has the shape of a diagonal matrix with the elements $c_0 \ldots c_3$, and element $c_0$ being equated with 1. Hence the correction consists in adding weighting factors $c_1$, $c_2$ and $c_3$ to detector currents $I_1, I_2$ and $I_3$.

$$\begin{bmatrix} S_0 \\ S_1 \\ S_2 \\ S_3 \end{bmatrix} = \begin{bmatrix} b_{00} & b_{01} & b_{02} & b_{03} \\ b_{10} & b_{11} & b_{12} & b_{13} \\ b_{20} & b_{21} & b_{22} & b_{23} \\ b_{30} & b_{31} & b_{32} & b_{33} \end{bmatrix} * \begin{bmatrix} I_0 \\ c_1 * I_1 \\ c_2 * I_2 \\ c_3 * I_3 \end{bmatrix}$$

With this method one succeeds in improving the accuracy of a polarimeter already calibrated.

According to Noé, R., DE 100 23 708 A 1, the instrument matrix of a polarimeter is found by employing for the calibration a large number of equally distributed states of polarisation. The calibration is based on the correlation of a large number of equally distributed polarisations for which a correlation matrix is known.

The calibration method according to Assam above requires exactly known input polarisations. The input polarisations are generated by a deterministic polarisation controller having a rotatable polariser and a rotatable λ/4 and a rotatable λ/2 wave plate, the accuracy being limited by mechanical faults of the rotatable devices, by imperfect optical elements and by possible faults of the optical coupling between the SOP generator and the polarimeter. A special problem is the exact determination of the delay of the wave plates used.

The polarimeter measures the four detector signals at the specified calibration SOPs. With these values the calibration matrix is determined, and the polarimeter thus clearly satisfies the requirements for SOP, DOP and power at exactly these values. Usually, however, the polarimeter shows measurement errors at all other polarisations, which become most clearly visible in a deviating degree of polarisation. The reason for this is that the four calibration SOPs were not known with sufficient accuracy and that the detector signals were not measured with sufficient precision.

The method for a verified post calibration of a polarimeter according to Heffner above uses the approach where the calibrated polarimeter has to show DOP=1 for all applied polarisations with DOP=1. The limits of this method lie in the simplicity of the correction values. While the three factors $c_1$, $c_2$ and $c_3$ can correct the amount of the detector currents, they cannot correct the direction of the polarisations at which the detector currents $I_1, I_2$ and $I_3$ reach their maximum and/or minimum. Polarimeters for which the polarisations, which lead to a maximum detector current, deviate from the polarisations of the base calibration, can only be corrected very imperfectly in this way. Effects of polarisers, whose transmission direction is unstable, or wave plates, whose delay is wave-dependent, cannot be corrected in this way.

The method according to Noé above requires the generation of a very large number of defined states of polarisation. The facilities needed for this are very costly. Also disadvantageous is the very long measuring time required for a very large number of polarisation measurements (in the order of magnitude of 200,000). Therefore a polarimeter that is calibrated with the help of fixed polarisation standards always shows measurement errors because the polarisations used for the calibration are incorrect. The errors in the polarimeter show most clearly in the display of the degree of polarisation DOP.

What is desired is a method of determining with high accuracy a calibration matrix for a polarimeter which provides improvements in the calibration of the polarimeter.

BRIEF SUMMARY OF THE INVENTION

Accordingly the present invention provides a highly accurate calibration of polarimeters by mounting an ideal polarisation transformer, which does not change the degree of polarisation while changing the state of polarisation, in front of the polarimeter to be calibrated, the variation in the degree of polarisation being a measure of the quality of the polarimeter calibration. A polarimeter having several detectors is calibrated by feeding several different input polarisations into the polarimeter to be calibrated, each of them having the same degree of polarisation and the same or known power; by detecting the detector currents for each detector at several different calibration polarisations, each of them representing one of the several input polarisations; by detecting the detector currents at an auxiliary polarisation which also represents one of the several input polarisations; and by determining an instrument matrix according to the several calibration polarisations detected and the allocated detector currents reflecting the known powers, if they are not equal, whereby at least one of the calibration polarisations is represented with at least one correction parameter as a variable and the value of the at least one correction parameter is determined such that one optimisation criterion is fulfilled according to the auxiliary polarisation. For this purpose, at least one further auxiliary state of polarisation is made available in addition to the several, in particular, four states of polarisation at which the base calibration is made. In the case of several auxiliary states of polarisation these are distributed as evenly as possible across a Poincaré sphere. Apart from the four polarisations, which are required for a standard calibration (for example H, 45°, V and R), L and −45° as well as eight further elliptical polarisations are, for example, also advantageously introduced: (azimuth/ellipticity)=(22.5°/±17.6°) (67.5°/±17.6°) (−67.5/±17.6°)

(−22.5°/±17.6°). The detector signals are thus determined for the six top limit values of the Stokes parameters ($s_1=\pm 1$, $s_2=\pm 1$ and $s_3=\pm 1$), and at the eight elliptical polarisations in the centre of all sphere segments, which are formed by the planes $s_1=0$, $s_2=0$ and $s_3=0$. Hence, a total of 14 current vectors ($I_{0,i}, I_{1,i}, I_{2,i}, I_{3,i}$) are available (the index i marks the polarisation), for which after an exact calibration the following must be true: the calculated power is constant and the calculated degree of polarisation (DOP) is 100%.

The limitation to the states of polarisation mentioned here is not mandatory. In the same way, any other polarisations may be used as auxiliary polarisations. What is important is not the exact position but only that all areas of the Poincaré sphere should be covered as far as possible. The calibration method according to the present invention is based on the "Four Point Calibration" of Azzam, but takes into account that the four states of polarisation for the calibration are incorrect, i.e., not exactly known. For this reason, correction parameters are envisaged in order to take into account the measurement and adjustment errors of the states of polarisation employed for the calibration. The correction parameters are determined in an iterative procedure. Thus, also the four states of polarisation, which existed for the first step of the calibration, i.e., the calibration according to the prior art, are automatically known more accurately. The calibration method brings the calculated degree of polarisation for all included states of polarisation to a common value of the degree of polarisation of 100% (DOP=1). The correct calibration is reached when the polarimeter always indicates a degree of polarisation of DOP=1 for any input polarisations which are applied 100% polarised to the input of the polarimeter. The error in the indication of the degree of polarisation of a polarimeter is always a measure of the quality of the polarimeter calibration.

The optimisation criterion introduced according to the present invention is:

$$DOP_{diff}=SQRT\{(1/n)*SUM_{i=1-n}(DOP_i-1)^2\}$$

$DOP_{diff}$ is the average square error provided by all the fourteen current vectors in the above case with the respective current calibration matrix. For an ideal polarimeter, $DOP_{diff}$ equals 0. The control index i can only start at i=5, because the four calibration polarisations in accordance with the standard calibration (at H, 45°, V and R) always provide DOP=1, as this was a requirement specified for the determination of the instrument matrix. By way of an iterative mathematical change of three out of the four states of calibration, the degree of polarisation DOP for the other auxiliary polarisations is continuously calculated and thus an optimisation to the criterion $DOP_{diff}=0$ attained.

The objects, advantages and other novel features of the present invention are apparent from the following detailed description when read in conjunction with the appended claims and attached drawing.

DETAILED DESCPRIPTION OF THE INVENTION

Figure 1:
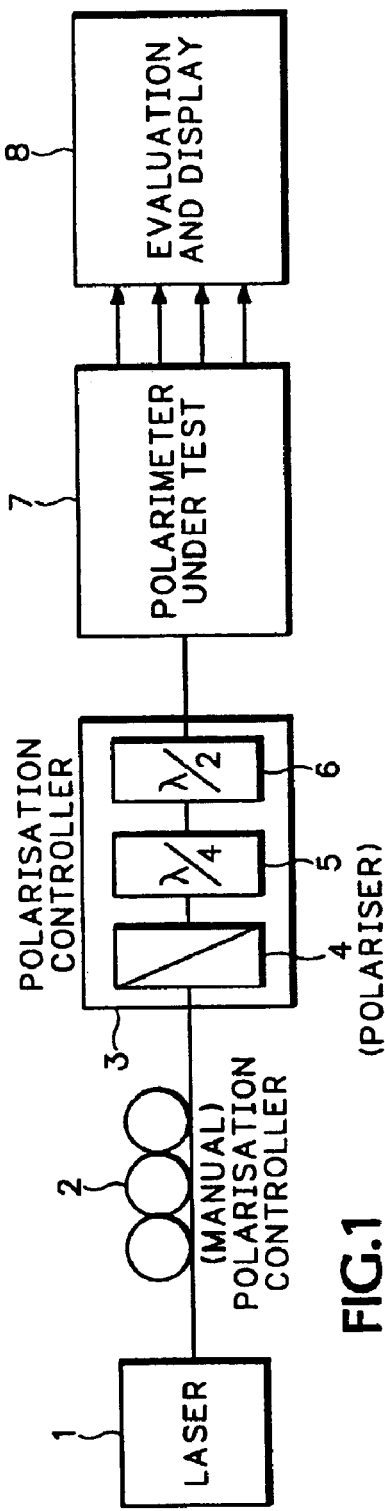
FIG. 1 is a block diagram view for the absolute calibration of a polarimeter with a deterministic polarisation controller according to the present invention.

FIG. 1 shows a first arrangement for the calibration of a polarimeter. The polarisation of a laser 1 is adjustable through a deterministic polarisation controller 3 having a rotatable polariser 4, a rotatable $\lambda/4$ wave plate 5 and a rotatable $\lambda/2$ wave plate 6. A manual polarisation controller 2 arranged in front has the task of adjusting the polarisation in front of the polariser 4 so that minimum loss occurs.

The polariser 4 guarantees a degree of polarisation of 100% (DOP=1). The adjustment angle of the $\lambda/4$ wave plate 5 influences the ellipticity, and the adjustment angle of the $\lambda/2$ wave plate 6 influences the azimuth of the polarisation at the output of the deterministic polarisation controller 3. Since the polarisation parameters are deterministically adjustable, i.e., the Stokes parameters are known, an absolute calibration is thus possible. The calibration refers to the co-ordinate system of the polarisation controller 3. The polarisations with DOP=1 thus generated reach the input of a polarimeter to be calibrated 7 featuring an evaluation and display unit 8.

Figure 2:
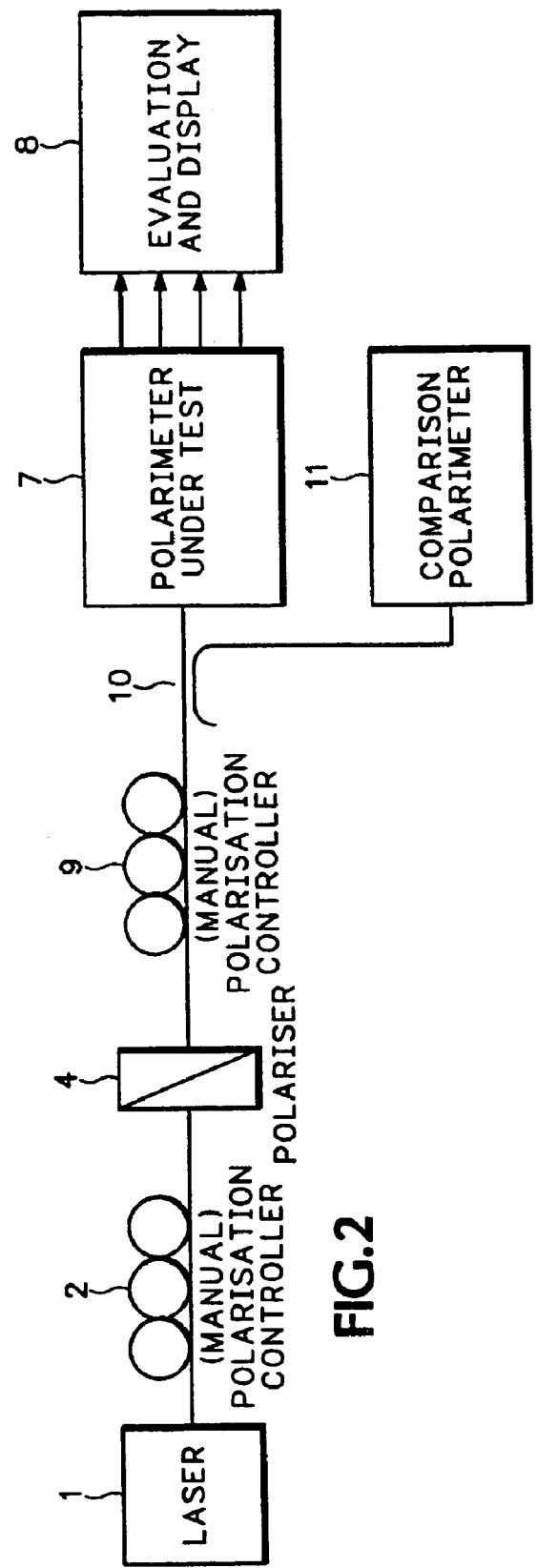
FIG. 2 is a block diagram view for the calibration of a polarimeter with a non-deterministic polarisation controller and a comparison polarimeter according to the present invention.

Using an arrangement according to FIG. 2, a polarimeter 7 may be calibrated with a comparison polarimeter 11. The laser light is 100% polarised in the polariser 4. The manual polarisation controller 2 arranged in front ensures minimum loss through the polariser 4. With the aid of a second manual polarisation controller 9 all possible states of polarisation may be generated while retaining the degree of polarisation DOP=1. A coupler 10 splits the optical power into two components: one is made available to the polarimeter to be calibrated 7 and one is made available to the comparison polarimeter 11. An absolute calibration is only achieved with respect to the reference level of the comparison polarimeter 11. If the coupler 10 is a fibre-optic device, an absolute calibration is achievable if the fibres involved in the set-up are not subjected to any movement. If the fibre is moved after all, any change to the input polarisation both in the polarimeter to be calibrated 7 and in the comparison polarimeter 11 effects the same changes in the display, not, however, the display of the same absolute value.

Figure 3:
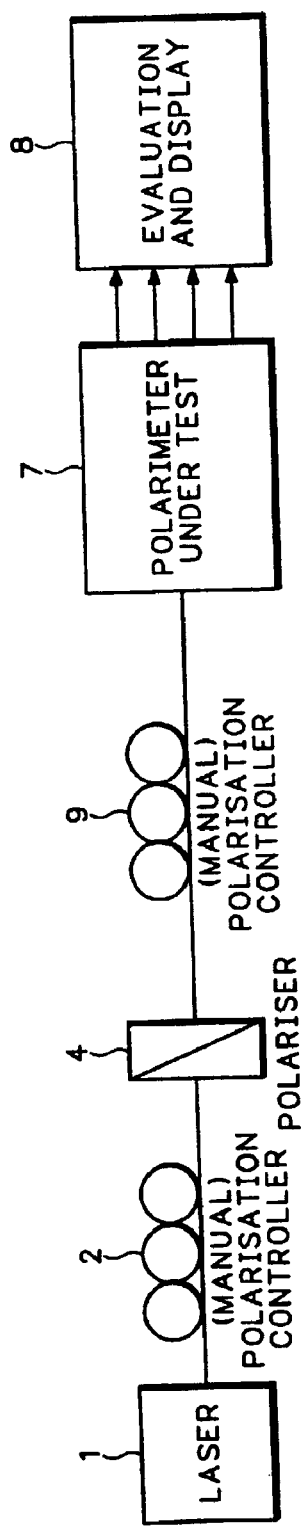
FIG. 3 is a block diagram view for the relative calibration of a polarimeter with a non-deterministic polarisation controller but without a comparison polarimeter according to the present invention.

With an arrangement according to FIG. 3 the calibration occurs without consideration for the outer reference system. An accurate, relative calibration is accomplished.

Figure 4:
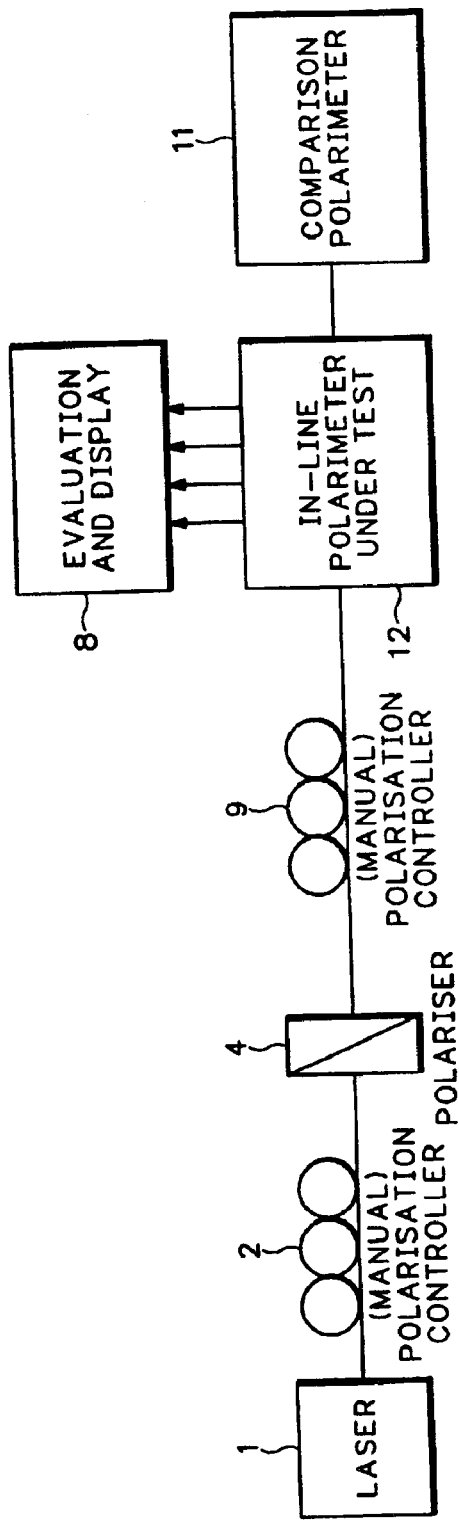
FIG. 4 is a block diagram view for the absolute calibration of an inline-fiber polarimeter with a non-deterministic polarisation controller and a comparison polarimeter according to the present invention.

With an arrangement according to FIG. 4 an in-line fibre polarimeter 12 may also be calibrated. A comparison polarimeter 11 may be connected directly to the output of the in-line fibre polarimeter 12. Here, the calibration is made to the reference system of the comparison polarimeter 11.

Figure 5:
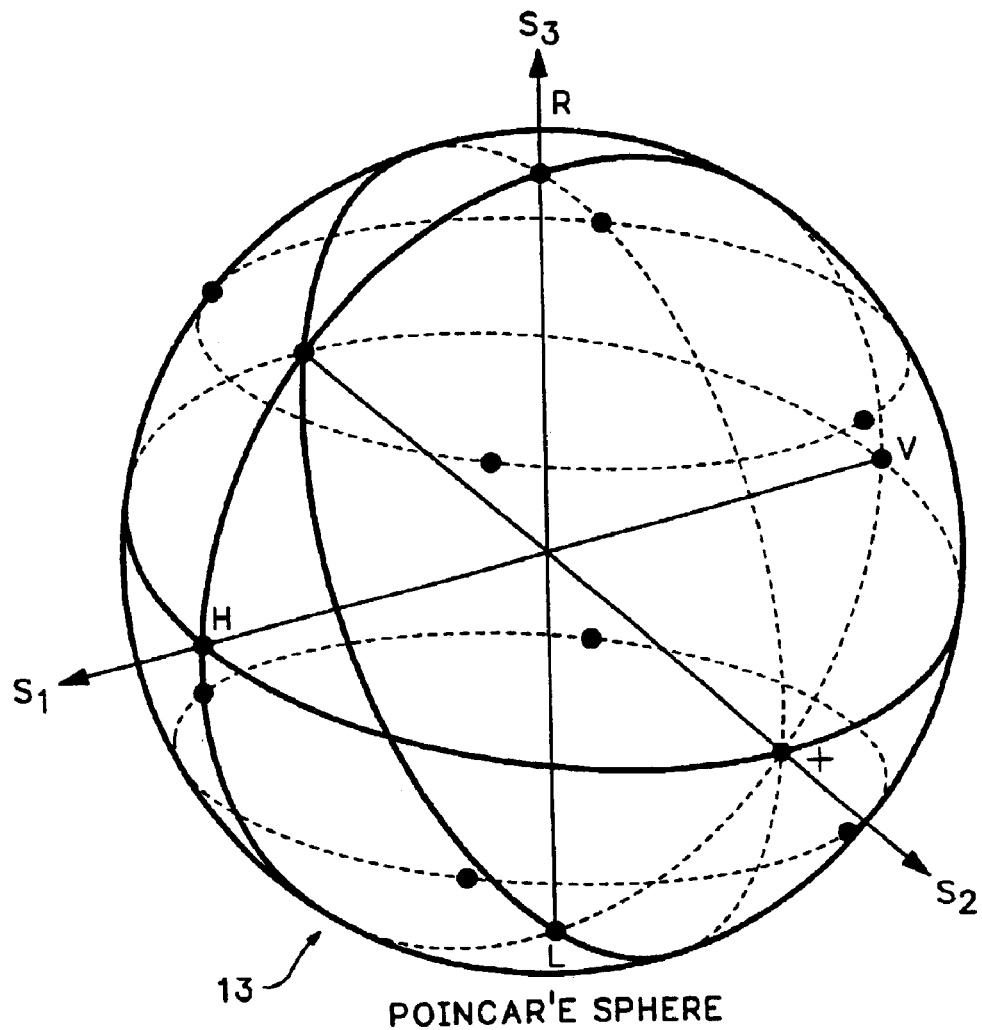
FIG. 5 is a graphic view illustrating the distribution of four calibration states of polarisation and another ten possible auxiliary states of polarization on a Poincare sphere according to the present invention.

FIG. 5 shows, as an example, the positions of the four calibration polarisations (H, 45°, V and R) (black) and the distribution of ten further auxiliary polarisations (grey) on a Poincaré sphere 13. The complete set of states of polarisation are shown in the below table:

| State of Polarisation | Azimuth θ (Degree) | Ellipticity ε (Degree) | $s_1 = S_1/S_0$ | $s_2 = S_2/S_0$ | $s_3 = S_3/S_0$ |
|---|---|---|---|---|---|
| H | 0 | 0 | 1 | 0 | 0 |
| 45° | 45 | 0 | 0 | 1 | 0 |
| V | 90 | 0 | −1 | 0 | 0 |
| R | — | 45 | 0 | 0 | 1 |
| L | — | −45 | 0 | 0 | −1 |
| −45° | −45 | 0 | 0 | −1 | 0 |
| 22.5° R | 22.5 | 17.63 | 1/√3 | 1/√3 | 1/√3 |
| 22.5° L | 22.5 | −17.63 | 1/√3 | 1/√3 | −1/√3 |
| 67.5° R | 67.5 | 17.63 | −1/√3 | 1/√3 | 1/√3 |
| 67.5° L | 67.5 | −17.63 | −1/√3 | 1/√3 | −1/√3 |
| −67.5° R | −67.5 | 17.63 | −1/√3 | −1/√3 | 1/√3 |
| −67.5° L | −67.5 | −17.63 | −1/√3 | −1/√3 | −1/√3 |
| −22.5° R | −22.5 | 17.63 | 1/√3 | −1/√3 | 1/√3 |
| −22.5° L | −22.5 | −17.63 | 1/√3 | −1/√3 | −1/√3 |

In the first embodiment of FIG. 1, the H, 45°, V and R input polarisations are used as examples for calibration, it being assumed that the H polarisation is accurately available and that the 45° polarisation is in fact linear. This definition allows all necessary degrees of freedom for shifting the calibration polarisations. Despite this, the relation to the absolutely specified polarisations is not lost. As a result of an iterative shift one obtains the instrument matrix A and its inverse matrix B of a very accurately calibrated polarimeter which only shows deviations with respect to the specified 45°, V and R calibration polarisations. The H polarisation and the linearity of the 45° polarisation remain unaffected, i.e., the polarimeter measures exactly the specified values.

The standard calibration according to Azzam is based on three linear polarisations (H, 45°, V) and a circular polarisation (R) (see above). The sequence in the columns was selected for (H, 45°, V, R). It is presupposed that the four calibration polarisations are available with a constant power. Without limitation of the generality, the total power is normalised to be $S_0=1$.

A monochromatic laser provides almost DOP=1, a polariser mounted downstream with a high extinction ratio (60 dB) surely leads to DOP=1. A polarisation controller, which has a polarisation-dependent loss, may be corrected by having the power at its output monitored with a wattmeter. The error in the calibration consists in not knowing (or not being able to measure) which four polarisations exist. This uncertainty may be eliminated retroactively. Step by step, the four polarisations which actually exist during the calibration are searched for. The step-by-step improvement is started with the "shifting " of a polarisation. The power remains constant at 1, the DOP remains unchanged at 100%. The calibration position H is assumed to be exact, it is not changed.

$$\begin{bmatrix} S_{0,0} \\ S_{1,0} \\ S_{2,0} \\ S_{3,0} \end{bmatrix} = \begin{bmatrix} 1 \\ 1 \\ 0 \\ 0 \end{bmatrix}$$

The 45° calibration polarisation is taken to be linear. The azimuth angle, however, could already be incorrect and is therefore corrected:

$$\begin{bmatrix} S_{0,1} \\ S_{1,1} \\ S_{2,1} \\ S_{3,1} \end{bmatrix} = \begin{bmatrix} 1 \\ k_0 \\ \sqrt{1 - k_0 * k_0} \\ 0 \end{bmatrix}$$

with $k_0$ being a correction variable allowing a minor deviation in the azimuth angle. The condition DOP=1, however, is retained for all $k_0$.

Calibration polarisation V may show deviations in the azimuth and an ellipticity not equal to 0, and is described by:

$$\begin{bmatrix} S_{0,2} \\ S_{1,2} \\ S_{2,2} \\ S_{3,2} \end{bmatrix} = \begin{bmatrix} 1 \\ \sqrt{1 - k_1 * k_1 - k_2 * k_2} \\ k_1 \\ k_2 \end{bmatrix}$$

Calibration polarisation R may show deviations from its ideal ellipticity angle of 45°, and the azimuth angle becomes freely selectable.

$$\begin{bmatrix} S_{0,3} \\ S_{1,3} \\ S_{2,3} \\ S_{3,3} \end{bmatrix} = \begin{bmatrix} 1 \\ k_3 \\ k_4 \\ \sqrt{1 - k_3 * k_3 - k_4 * k_4} \end{bmatrix}$$

The complete S matrix is thus:

$$S = \begin{bmatrix} 1 & 1 & 1 & 1 \\ 1 & k_0 & -\sqrt{1 - k_1 * k_1 - k_2 * k_2} & k_3 \\ 0 & \sqrt{1 - k_0 * k_0} & k_1 & k_4 \\ 0 & 0 & k_2 & \sqrt{1 - k_3 * k_3 - k_4 * k_4} \end{bmatrix}$$

With the five correction parameters $k_0$ to $k_4$ there are five degrees of freedom, which, when multiplied, allow improving the precision of the polarimeters.

The calibration is performed, i.e., the instrument matrix is calculated, as indicated above to derive the calibration matrix B so that the calibrated polarimeter may determine the Stokes parameters, i.e., the polarisations, the DOP and the power from the current vector I.

With the calibration matrix B obtained, the degree of polarisation $DOP_i$ is calculated for all 14 polarisations.

$$DOP_i = \sqrt{S_{1,i} * S_{1,i} + S_{2,i} * S_{2,i} + S_{3,i} * S_{3,i}} / S_{0,i}$$

In this way the deviation of all auxiliary polarisations from the ideal value DOP=1 is determined. As indicated above the square root of the average of all $(DOP_i-1)^2$ produces the variable $DOP_{diff}$. $DOP_{diff}$ is minimised by manipulation of the correction parameters $k_0$ to $k_4$. One after the other, the correction parameters $k_0$ to $k_4$ are manipulated according to a trial-and-error method and the quality criterion $DOP_{diff}$ is determined in each case. With the change of a correction parameter, the polarisation linked with it is shifted, P=1 and DOP=1 are, however, retained.

Using the shifted Stokes vector a calibration calculation is performed again. Depending on the success (how has $DOP_{diff}$ changed), the process continues. If $DOP_{diff}$ has become smaller, the correction parameter change is retained and the next shift is performed. If $DOP_{diff}$ has increased, however, the last change is discarded and the direction of the shift changed. If this does not lead to an improvement either, the next correction parameter is used.

If no further improvements are possible for the correction parameters $k_0$ to $k_4$ with the step width initially selected, the step width is decreased, i.e., halved.

The objective is:

$$DOP_{diff} \rightarrow Min$$

As a result one iteratively obtains the actual states of polarisation at which the calibration points (45°, V and R) are picked up.

The precondition that the H polarisation is error-free and the 45° polarisation is in fact linear is not necessary. It is also possible that all four specified polarisations are incorrect. Eight instead of five correction parameters may be envisaged. The additional degrees of freedom included are not necessary but only increase the cost and the calculation time of the calibration. If the H and 45° polarisations, too, were incorrect, the polarimeter will not attain an absolute calibration, but only a relative calibration. This also includes the consistency of the degree of polarisation across all states of polarisation.

Figure 6:
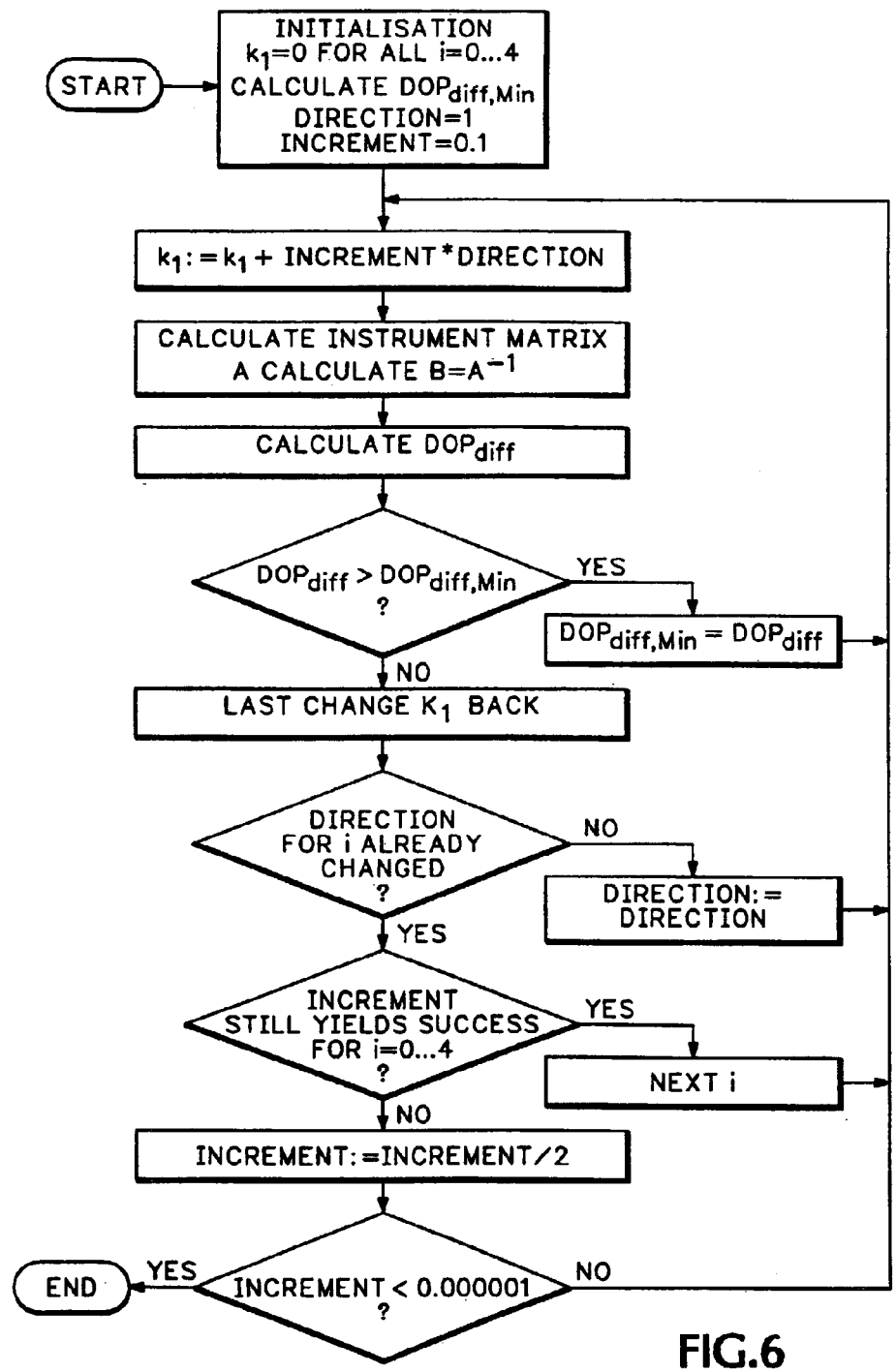
FIG. 6 is a flow chart view illustrating the iteractive determination of correction parameters according to the present invention.

As an example, the iterative determination of the correction parameters can take place according to the flow chart of FIG. 6.

In the second embodiment of FIG. 2 any 4-detector polarimeter may attain an exact relative calibration in accordance with the proposed method by means of random polarisation specifications. Relative means that the measurement values determined for power and DOP are correct, and that the absolute state of polarisation is exactly known except for a simple polarisation transformation. In a final step, the connection to an absolute calibration level may be established quite easily.

The calibration of a polarimeter by means of a few random polarisation samples includes the following steps:

1st Step: Generation and Storage of States of Polarisation

A polarisation controller, or a polarisation scrambler, successively generates different states of polarisation, all of which have the normalised power 1 and the degree of polarisation DOP=1. The states of polarisation representing the above-mentioned calibration and auxiliary polarisations preferably are evenly distributed across the Poincaré sphere. A usable number of polarisations already exist with 10 . . . 50 different states of polarisation. When including the polarisation samples it is important to ensure that large areas of the Poincaré sphere are not left out, so an approximately even distribution is desired.

Decisive for the accuracy of the polarimeter to be calibrated is the stability of the DOP and of the power of all generated states of polarisation. For this reason, the polarisations are generated by a polarisation controller which does not have any PDL itself and for which the polarisation changes do not result in any power fluctuation, if possible.

A very simple and perfect version of such a polarisation controller is the fibre at the input of the polarimeter itself. By moderate movement of the fibre, birefringence effects occur due to bending and torsion which lead to very different kinds of polarisation at the fibre end. If a bending radius of the fibre does not fall below a minimum radius (approx. 4 cm, for example), no measurable power fluctuations occur (<0.001 dB). In this way the polarimeter may also be calibrated in a very accurate way with respect to its relative power indication (Stokes parameter $S_0$) without any technical means.

After such calibration with extremely constant power, the polarimeter is able to carry out a polarization-independent measurement of the optical power. This is the essential feature of a low PDR power meter (PDR=polarization dependent response). The PDR of such a calibrated polarimeter is many times less than the PDR of a common power meter with a simple photodiode.

If the polarimeter to be calibrated has an optical input with a small amount of polarization dependent loss (PDL), which is unavoidable due to fibre plugs (straight=PC or angular= APC), this process may nevertheless be applied. Instead of the fibre between the connector and the polarimeter, the fibre in front of the connector is moved. This results in small amounts of power fluctuation at the input of the polarimeter according to the PDL of the connector, which hinders an accurate calibration of the polarimeter.

However, if the input of the polarimeter is defined as the position in front of the connector being affected with PDL, the PDL of the connector is already part of the internal features of the polarimeter. As a result, an accurate low PDR calibration is again possible. The reference point for the power measurement is always the position of the fibre which creates the polarisation fluctuations, i.e., the polarisation controller. In this way disturbing elements in the measurement setup which are affected with PDL are eliminated completely.

2nd Step: Search for Suitable States of Polarisation for the Calibration

From the plenitude of current vectors $[I_0, I_1, I_2, I_3]^T$ which are measured at the corresponding Stokes vectors $[S_0, S_1, S_2, S_3]^T$, those are selected, especially those four, that correspond to states of polarisation which are as far apart as possible on the Poincaré sphere. This may be achieved by selecting current vectors at each of which a maximum current is measured for $I_0, I_1, I_2$ and/or $I_3$. The four allocated polarisations are thus relatively close to the polarisations at which the currents $I_0, I_1, I_2$ and $I_3$ actually reach their maximum. On a well determined polarimeter, these four polarisations are far apart on the Poincaré sphere. From the design of the polarimeter it also is known approximately at which four polarisations the maxima occur.

3rd Step: Creating a First Instrument Matrix A by Approximation

The polarimeter responds when a Stokes vector S with a current vector I is applied. The behaviour is fully determined by the instrument matrix A, as indicated above, with the total power normalised to be $S_0=1$.

For example without limitation of the generality, a polarimeter with the maxima polarisations (azimuth/ellipticity)= (−22.5°/0°), (22.5°/0°), (90°/22.5°) and (90°/−22.5°) is assumed. The four polarisations are very far apart on the Poincaré sphere and almost form a tetrahedron with the maximum possible volume. Under these conditions the instrument matrix of the polarimeter has a large determinant, i.e., the polarisation measurement values are insensitive to possible measurement errors. The four polarisations form the S matrix:

$$S = \begin{bmatrix} 1 & 1 & 1 & 1 \\ 1/\sqrt{2} & 1/\sqrt{2} & -1/\sqrt{2} & -1/\sqrt{2} \\ -1/\sqrt{2} & 1/\sqrt{2} & 0 & 0 \\ 0 & 0 & 1/\sqrt{2} & -1/\sqrt{2} \end{bmatrix}$$

4th Step: Entering Correction Parameters

Since the polarisations at which the maximum detector currents occur are only very roughly known through the scrambling of the polarisation, correction parameters are used which, when chosen correctly, lead to the actual polarisations.

The adding of correction parameters means a pictorial shift of the relevant polarisation on the Poincaré sphere. Therefore, the power remains constant at P=1 and the degree of polarisation remains unchanged at DOP=1. The Stokes parameters $S_1$, $S_2$ and $S_3$ are thus no longer freely selectable, but follow the relationship that the sum of the squares equals one. With the change of two Stokes parameters, the third results inevitably pursuant to this relationship. There is no ambiguity through the free choice of the sign for the third Stokes parameter because the polarisations only change by small amounts.

The polarisation (−22.5°/0°), at which the current $I_0$ approximately has its maximum, is described by:

$$\begin{bmatrix} S_{0,0} \\ S_{1,0} \\ S_{2,0} \\ S_{3,0} \end{bmatrix} = \begin{bmatrix} 1 \\ 1/\sqrt{2} \\ -1/\sqrt{2} \\ 0 \end{bmatrix}$$

It is assumed to be exact and is not corrected because it makes no sense to shift all four polarisations.

The putative polarisation (22.5°/0°) is described by:

$$\begin{bmatrix} S_{0,1} \\ S_{1,1} \\ S_{2,1} \\ S_{3,1} \end{bmatrix} = \begin{bmatrix} 1 \\ k_0 + 1/\sqrt{2} \\ \sqrt{1 - (k_0 + 1/\sqrt{2})*(k_0 + 1/\sqrt{2})} \\ 0 \end{bmatrix}$$

This polarisation is and remains linear, through $k_0$ only the azimuth becomes adjustable.

The putative polarisation (90°/22.5°) is described by:

$$\begin{bmatrix} S_{0,2} \\ S_{1,2} \\ S_{2,2} \\ S_{3,2} \end{bmatrix} = \begin{bmatrix} 1 \\ k_1 - 1/\sqrt{2} \\ k_2 \\ \sqrt{1 - (k_1 - 1/\sqrt{2})*(k_1 - 1/\sqrt{2}) - k_2*k_2} \end{bmatrix}$$

The putative polarisation (90°/−22.5°) is described by:

$$\begin{bmatrix} S_{0,3} \\ S_{1,3} \\ S_{2,3} \\ S_{3,3} \end{bmatrix} = \begin{bmatrix} 1 \\ k_3 - 1/\sqrt{2} \\ k_4 \\ -\sqrt{1 - (k_3 - 1/\sqrt{2})*(k_3 - 1/\sqrt{2}) - k_4*k_4} \end{bmatrix}$$

Hence, the complete S matrix is:

$$S = \begin{bmatrix} 1 & 1 & 1 & 1 \\ 1/\sqrt{2} & 1/\sqrt{2} + k_0 & -1/\sqrt{2} + k_1 & -1/\sqrt{2} + k_3 \\ -1/\sqrt{2} & \sqrt{1 - (1/\sqrt{2} + k_0)*(1/\sqrt{2} + k_0)} & k_2 & k_4 \\ 0 & 0 & \sqrt{1 - (k_1 - 1/\sqrt{2})*(k_1 - 1/\sqrt{2}) - k_2*k_2} & -\sqrt{1 - (k_3 - 1/\sqrt{2})*(k_3 - 1/\sqrt{2}) - k_4*k_4} \end{bmatrix}$$

The instrument matrix A is calculated with all correction parameters initially set at $k_i=0$.

5th Step: Inverting the Instrument Matrix $B = A^{-1}$

The polarimeter is thus able for the first time to transform a current vector I into the associated, albeit highly inaccurate, Stokes vector S.

$S = B*I$

6th Step: Calculation of the Error Criterion

The degree of polarisation $DOP_i$ is calculated for all n of the current vectors $[I_0, I_1, I_2, I_3]^T$ included under step 1, as indicated above. The error criterion $DOP_{diff}$ is determined from the mean square error for DOP=1.

7th Step: Iterative Minimisation of the DOP Error Criterion

The error variable $DOP_{diff}$ is minimised by iterative methods. To this end the correction parameters $k_0$ to $k_4$ are determined successively. With the change of a correction parameter, the polarisation linked with it is shifted, P=1 and DOP=1 are retained. The objective is: $DOP_{diff} \rightarrow Min$.

In this way step by step the actual polarisations at which the four current vectors were picked up is determined. As a result from the iterative process the calibration matrix B, with which the error criterion is the smallest, is obtained. This ends the relative calibration of the polarimeter.

8th Step: Production of an Absolute Calibration Level

In order to produce an absolute allocation to a calibration level, only two different, known polarisations are needed, which must not be orthogonal. The polarimeter is absolutely calibrated when it correctly shows two absolutely specified non-orthogonal polarisations. All other polarisations are then also shown correctly.

For the determination of the two polarisations for the absolute calibration, two variants are proposed:

Variant 1: Calibration with Reference to an Outer Reference Level

As an example, the horizontal polarisation H and another linear polarisation which lies at an azimuth of about +45° are used. These polarisations are obtained by a rotatable polariser.

Variant 2: Calibration with Reference to an Inner Reference Level

An inner reference level calibration uses the polarisation direction of polarisers or wave plates of the polarimeter itself as a reference point. According to the example described, the two polarisations which lead to maxima of the detector currents $I_0$ and $I_1$ form a reference level. The exact determination of the polarisations (with reference to the relative reference system) occurs simply through an iterative search for the maxima of the detector currents $I_0$ and $I_1$. This requires the use of the known instrument matrix A.

An algorithm generates all possible Stokes vectors S with P=1 and DOP=1 in a grid, which may be relatively coarse. In parallel the maximum detector current $I_{0,max}$ is determined. The search is continued with a finer grid around the maximum found. In this way the Stokes vector (the polarisation), at which $I_0$ becomes equal to max, is determined with accuracy.

An analogous procedure is used for the detector current $I_1$. The two polarisations are thus:

$$\begin{bmatrix} 1 \\ S1 \\ S2 \\ S3 \end{bmatrix} 0, \max; \quad \begin{bmatrix} 1 \\ S1 \\ S2 \\ S3 \end{bmatrix} 1, \max$$

A unitary transformation is searched for which leaves P and DOP unaffected, contains no PDL, but causes a rotation on the Poincaré sphere.

Variant 1 provides two polarisations calculated by the polarimeter which have to be transformed so that they correspond with the absolute specifications. Variant 2 provides two distinctive polarisations which have a reference to the inner configuration of the polarimeter. These two random polarisations also are transformed into a linear reference level.

The task of the absolute calibration consists always in the transformation of two non-orthogonal polarisations into two other non-orthogonal polarisations. The transformation corresponds to a rotation on the Poincaré sphere.

What is being looked for is the transformation matrix M between random polarisations $S_{in}$ and $S_{out}$.

$$S_{out} = M * S_{in}$$

where $$M = \begin{bmatrix} 1 & 0 & 0 & 0 \\ 0 & m_{1,1} & m_{1,2} & m_{1,3} \\ 0 & m_{2,1} & m_{2,2} & m_{2,3} \\ 0 & m_{3,1} & m_{3,2} & m_{3,3} \end{bmatrix}$$

Because of the pure polarisation transformation (no loss, no PDL), the inner matrix m is an orthogonal 3×3 matrix with Det m=1

The reduced 3×3 matrix m is used to transform the normalised Stokes parameters $(s_1, s_2, s_3)_{in}$ to the normalised Stokes parameters $(s_1, s_2, s_3)_{out}$. DOP is taken to equal 1, therefore the sum of the squares equal to one is true for every vector.

Similar to the four-point calibration according to Azzam, the full 3×3 matrix m may be determined here in an analogous way from, in each case, three states of polarisation before and three states of polarisation after the transformation, with the 1st index giving the Stokes parameter and the 2nd index giving the index of the 3 polarisations (1, 2, 3).

The first two polarisations, which are to be made to agree, are known:

$$\begin{bmatrix} s_{1,1} \\ s_{2,1} \\ s_{3,1} \end{bmatrix}_{in} \quad \text{and} \quad \begin{bmatrix} s_{1,1} \\ s_{2,1} \\ s_{3,1} \end{bmatrix}_{out}$$

The second polarisation $$\begin{bmatrix} s_{1,2} \\ s_{2,2} \\ s_{3,2} \end{bmatrix}_{in}$$

has a angular distance of α on the Poincaré sphere relative to the first given polarisation.

$$\alpha = \arccos\left( \begin{bmatrix} s_{1,1} \\ s_{2,1} \\ s_{3,1} \end{bmatrix}_{in} * \begin{bmatrix} s_{1,2} \\ s_{2,2} \\ s_{3,2} \end{bmatrix}_{in} \right)$$

The same distance also is observed by the first and the second polarisation after the transformation.

Moreover, there is the requirement that the first polarisation be identical to H and the second polarisation lies on the equator with theta>0.

$$\begin{bmatrix} s_{1,1} \\ s_{2,1} \\ s_{3,1} \end{bmatrix}_{out} = \begin{bmatrix} 1 \\ 0 \\ 0 \end{bmatrix}_{out}; \begin{bmatrix} s_{1,2} \\ s_{2,2} \\ s_{3,2} \end{bmatrix}_{out} * \begin{bmatrix} s_{1,2} \\ s_{2,2} \\ 0 \end{bmatrix}_{out} ;$$

$$s_{2,2} > 0; s_{2,2out} * s_{2,2out} + s_{1,2out} * s_{1,2out} = 1$$

The angle α between the first and the second polarisations is directly reflected in $s_{1,2\ out}$ and $s_{2,2\ out}$.

$$\arctan(s_{2,2out}/s_{1,2out}) = \arccos\left( \begin{bmatrix} s_{1,1} \\ s_{2,1} \\ s_{3,1} \end{bmatrix}_{in} * \begin{bmatrix} s_{1,2} \\ s_{2,2} \\ s_{3,2} \end{bmatrix}_{in} \right)$$

The third vectors for in and out, which are still missing, are simply obtained by the middle polarisation of the first two. With this, all three polarisations before the transformation (in) and after the transformation (out) are known. Matrix m is given by:

$$m = s_{out} * s_{in}^{-1}$$

$$m = \begin{bmatrix} s_{1,1} & s_{1,2} & s_{1,3} \\ s_{2,1} & s_{2,2} & s_{3,2} \\ s_{3,1} & s_{3,2} & s_{3,3} \end{bmatrix}_{out} * INV \begin{bmatrix} s_{1,1} & s_{1,2} & s_{1,3} \\ s_{2,1} & s_{2,2} & s_{3,2} \\ s_{3,1} & s_{3,2} & s_{3,3} \end{bmatrix}_{in}$$

The transformation embodied by m corresponds to the rotation of the Cartesian co-ordinate system $(s_1, s_2, s_3)$ within the Poincaré sphere.

$$\begin{bmatrix} s_1 \\ s_2 \\ s_3 \end{bmatrix}_{out} = \begin{bmatrix} \cos\alpha_1 & \cos\beta_1 & \cos\chi_1 \\ \cos\alpha_2 & \cos\beta_2 & \cos\chi_2 \\ \cos\alpha_3 & \cos\beta_3 & \cos\chi_3 \end{bmatrix} * \begin{bmatrix} s_1 \\ s_2 \\ s_3 \end{bmatrix}_{in}$$

where:

$\alpha_1, \beta_1, \chi_1$ angles between the $s_1$ axes before and after the rotation, $\alpha_2, \beta_2, \chi_2$ angles between the $s_2$ axes before and after the rotation, $\alpha_3, \beta_3, \chi_3$ angles between the $s_3$ axes before and after the rotation.

The following holds $$DET \begin{bmatrix} \cos\alpha_1 & \cos\beta_1 & \cos\chi_1 \\ \cos\alpha_2 & \cos\beta_2 & \cos\chi_2 \\ \cos\alpha_3 & \cos\beta_3 & \cos\chi_3 \end{bmatrix} = 1$$

The whole Müller matrix of the polarisation transformation is:

$$M = \begin{bmatrix} 1 & 0 & 0 & 0 \\ 0 & m_{1,1} & m_{1,2} & m_{1,3} \\ 0 & m_{2,1} & m_{2,2} & m_{2,3} \\ 0 & m_{3,1} & m_{3,2} & m_{3,3} \end{bmatrix}$$

This matrix M for the absolute calibration may be incorporated directly into the inverse instrument matrix B:

$$S = M*B*I$$

The matrices M and B are expediently combined to a matrix C.

$$S = C*I$$

Matrix C contains the very good relative accuracy obtained by the iterative process, together with the absolute orientation of the calculated polarisations.

Thus the present invention provides a highly accurate calibration of polarimeters using an iterative process by calibrating the polarimeter with respect to four Stokes vectors corresponding to four states of polarisation on a Poincare sphere as far apart as possible as calibration polarisations, at least one of the Stokes vectors having a variable correction parameter, by measuring the degree of polarisation of an auxiliary state of polarisation, and by varying the correction parameter until the measured degree of polarisation of the auxiliary state of polarisation equals the measured degrees of polarisation of the calibration polarisations.

What is claimed is:

1. A method of calibrating a polarimeter of the type having at least four detectors, each detector generating a detector current which is related to a Stokes parameter in response to a light signal input to the polarimeter, comprising the steps of:

inputting a plurality of different states of polarisation of the light signal to the polarimeter, each state of polarisation having a same power and degree of polarisation;

measuring the detector currents for each of at least four of the different states of polarisation designated as calibration polarisations to form a current matrix for a Stokes matrix of the related Stokes parameters, at least one of the Stokes parameters including a correction parameter;

determining a correction matrix from the detector currents and the Stokes matrix for the calibration polarisations;

measuring the detector currents for at least one further state of polarisation designated as an auxiliary polarisation to determine the degree of polarisation for the auxiliary polarisation; and optimising a quality criterion by iteratively varying the correction parameter and repeating the above steps until the quality criterion is a minimum, the quality criterion being a function of the degree of polarization for the auxiliary polarisation.

2. The method according to claim 1 wherein the auxiliary polarisation comprises a plurality of auxiliary polarisations and the quality criterion comprises a function of the degrees of polarisation for the auxiliary polarisations.

3. The method according to claim 2 wherein the plurality of polarisations comprise ten auxiliary polarisations.

4. The method according to claim 3 wherein the correction parameter comprises five correction parameters, each of which is successively varied iteratively in the optimising step.

5. The method according to claim 1 or 3 wherein the different states of polarisation are distributed evenly across a Poincare sphere.

6. The method according to claim 1 wherein the calibration polarisations are known states of polarisation.

7. The method according to claim 1 wherein the calibration polarisations are random states of polarisation which are as far apart as possible across a Poincare sphere such that the detector currents allow a rough allocation to known states of polarisation.

8. The method according to claim 1 wherein the polarimeter comprises a low polarisation dependent response power meter.

9. The method according to claim 2 wherein the quality criterion comprises the square root of the average of the difference between the degrees of polarisation measured for the auxiliary polarisations and the same degree of polarisation.

10. The method according to claim 1 wherein the same degree of polarisation is one hundred percent.

11. The method according to claim 1 wherein the optimising step comprises the steps of:

varying the correction parameter by a step value for each iteration until the quality criterion is at the minimum; and changing the step value to a smaller step value for the varying step and repeating the optimising step.

12. The method according to claim 1 further comprising the step of producing an absolute allocation to a calibration level using two known, non-orthogonal states of polarisation such that the polarimeter correctly shows two absolutely known, non-orthogonal states of polarisation.

13. The method according to claim 12 wherein the producing step comprises the step of calibrating with reference to an outer reference level.

14. The method according to claim 12 wherein the producing step comprises the step of calibrating with reference to an inner reference level.

15. The method according to claim 14 wherein the calibrating step comprises the steps of:

searching for two polarisations as the inner reference level which lead to maxima of the corresponding detector currents using the calibration matrix; and transforming the two polarisations into a linear reference level, the transforming step corresponding to a rotation on a Poincare sphere.

\* \* \* \* \*

UNITED STATES PATENT AND TRADEMARK OFFICE
CERTIFICATE OF CORRECTION

PATENT NO. : 6,917,427 B2
APPLICATION NO. : 10/406693
DATED : July 12, 2005
INVENTOR(S) : Egbert Krause et al.

Page 1 of 1

It is certified that error appears in the above-identified patent and that said Letters Patent is hereby corrected as shown below:

Claim 5, column 16, line 11, "claim" should read --claims--.

Signed and Sealed this

Nineteenth Day of February, 2008

JON W. DUDAS
*Director of the United States Patent and Trademark Office*